(12) United States Patent
Matsumoto (10) Patent No.: US 8,550,133 B2
(45) Date of Patent: Oct. 8, 2013

(54) PNEUMATIC TIRE WITH ASYMMETRIC TREAD PATTERN

(75) Inventor: Tadao Matsumoto, Kobe (JP)

(73) Assignee: Sumitomo Rubber Industries, Ltd., Kobe-shi, Hyogo (JP)

( * ) Notice: Subject to any disclaimer, the term of this patent is extended or adjusted under 35 U.S.C. 154(b) by 883 days.

(21) Appl. No.: 12/608,066

(22) Filed: Oct. 29, 2009

(65) Prior Publication Data

US 2010/0139826 A1 Jun. 10, 2010

(30) Foreign Application Priority Data

Dec. 8, 2008 (JP) ................................. 2008-312456

(51) Int. Cl.
*B60C 11/03* (2006.01)

(52) U.S. Cl.
USPC ................ 152/209.8; 152/209.9; 152/209.22; 152/209.27; 152/DIG. 3

(58) Field of Classification Search
USPC ................. 152/209.8, 209.9, 209.18, 209.22, 152/209.27, 209.28, DIG. 3
See application file for complete search history.

(56) References Cited

U.S. PATENT DOCUMENTS

| | | | |
|---|---|---|---|
| 5,759,313 A | 6/1998 | Shirai et al. | |
| 2009/0114324 A1* | 5/2009 | Ohki et al. | 152/209.8 |

FOREIGN PATENT DOCUMENTS

| | | |
|---|---|---|
| DE | 10-2005-058365 A1 | 6/2007 |
| EP | 0402595 A2 | 12/1990 |
| EP | 402595 A2 * | 12/1990 |
| EP | 0773117 A1 | 5/1997 |
| JP | 04-133805 A * | 5/1992 |
| JP | 05-213013 A * | 8/1993 |
| JP | 2004-155416 A | 6/2004 |
| WO | WO 2007/065760 A1 | 6/2007 |
| WO | WO-2007-145177 A1 * | 12/2007 |

OTHER PUBLICATIONS

Machine translation for Japan 05-213013 (no. date).*

* cited by examiner

*Primary Examiner* — Steven D Maki
(74) *Attorney, Agent, or Firm* — Birch, Stewart, Kolasch & Birch, LLP (57) ABSTRACT

A tire having an asymmetric tread pattern that land proportion of outer side area $2o$ is larger than inner side area $2i$, but having a reduced difference in drainage performance between tires on right and left wheels, the tire having tread surface 2 divided by four circumferential grooves 3 and 4 into center land 5, middle lands 6, 6 and shoulder lands 7, 7, wherein middle land $6o$ and shoulder land $7o$ in the outer side area $2o$ are divided respectively by outer middle lateral grooves $8o$ and outer shoulder lateral grooves $10o$ into blocks $9o$ and blocks $11o$, inclination direction of the middle lateral grooves $8o$ is opposite to that of the shoulder lateral grooves $10o$ with respect to tire axial direction, and the lateral grooves $8o$ and $10o$ are inclined at an angle θmo between 5° and 45° and at an angle θso between more than 0° and not more than 40°, respectively.

7 Claims, 6 Drawing Sheets

PNEUMATIC TIRE WITH ASYMMETRIC TREAD PATTERN

BACKGROUND OF THE INVENTION

The present invention relates to a pneumatic tire having an asymmetric tread pattern wherein a right and a left half of a tread portion on both sides of the tire equator have different patterns, and more particularly to a pneumatic tire that a difference in performances depending on the rotation direction of the tire is reduced.

Various tread patterns formed by tread grooves, including a circumferential groove extending in the circumferential direction of the tire and a lateral groove extending in a direction intersecting with the circumferential groove, have been proposed in order to enhance a wet performance of tires. As one type of the tread patterns is known, for example, an asymmetric pattern such that patterns on the both sides of the tire equator are different, as disclosed in JP-A-2004-155416.

A tire with an asymmetric pattern has the advantage that both dry and wet performances can be achieved at high levels, since a land proportion for an outer area of the tread surface which lies on a vehicle outer side with respect to the tire equator when the tire is fitted to a vehicle can be made larger than a land proportion for an inner area of the tread surface which lies on a vehicle inner side with respect to the tire equator. The reason is that the vehicle outer side area has a large influence on the steering stability since a load applied to the vehicle outer side area becomes relatively large as compared with the vehicle inner side area at the time of cornering or lane change and, therefore, the dry performances can be improved by increasing the land proportion of the vehicle outer side area to thereby enhance the pattern rigidity and to increase the ground contact area, while maintaining the wet performances as a whole tire, particularly drainage performance, at a high level by the vehicle inner side area which has a smaller land proportion.

Figure 6:
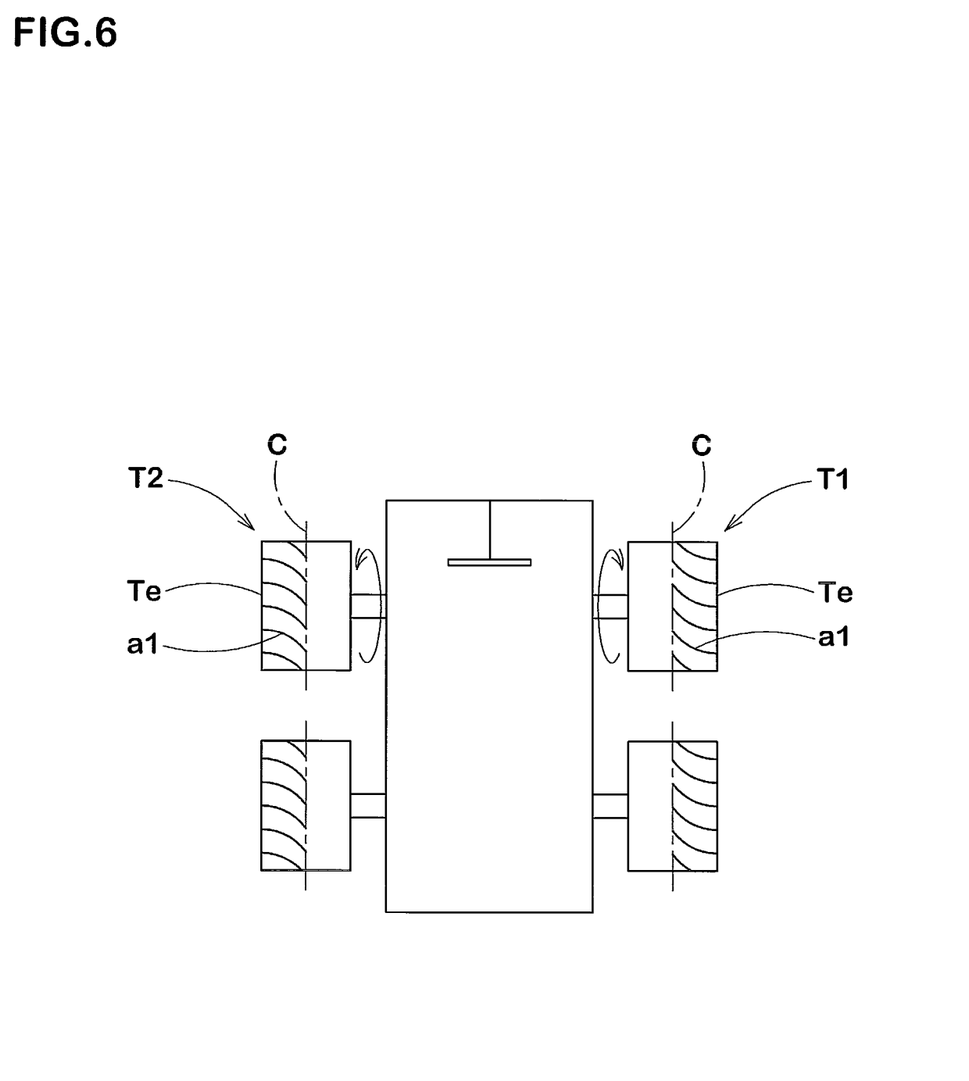
FIG. 6 is a view of attachment of tires for illustrating problems of tires having an asymmetric tread pattern.

However, as shown exaggeratingly in FIG. 6, in the case that tires having such an asymmetric pattern are fitted to a vehicle, the tread pattern is directed in opposite directions with respect to the rotation direction of the tires between a tire T1 on a right wheel and a tire T2 on a left wheel. That is, explaining with reference to FIG. 6, lateral grooves a1 in the outer area of the right wheel tire T1 extend from a tire equator C side toward a tread edge Te side and are inclined in a backward direction with respect to the rolling direction of the tire, whereas lateral grooves a1 in the outer area of the left wheel tire T2 extend from the tire equator C side toward the tread edge Te side and are inclined in a forward direction with respect to the tire rolling direction.

In this case, the right wheel tire T1 can exhibit a high drainage performance, since water on a road flows in a direction of discharge from the tread edge Te. In contrast, the left wheel tire T2 is inferior in the drainage performance, since water on a road flows toward the tire equator C. Like this, tires with an asymmetric pattern have a problem that as to the drainage performance, a difference may occur due to inclination of lateral grooves between the tire mounted on the right wheel and the tire mounted on the left wheel.

In particular, since the vehicle inner side area has generally a small land proportion, in other words, since the vehicle inner side area has a large groove area and accordingly exhibits a high drainage performance, an influence of the vehicle inner side area onto a difference in the drainage performance between the right and left wheel tires is small, but the vehicle outer side area has generally a large land proportion and accordingly has a large influence on the difference in the drainage performance between the right and left wheel tires.

Accordingly, it is an object of the present invention to provide a pneumatic tire which has an asymmetric tread pattern such that the land proportion of the vehicle outer side area is larger than the land proportion of the vehicle inner side area, but which is capable of suppressing occurrence of a difference in drainage performance between the tire fitted to a right wheel and the tire fitted to a left wheel of a vehicle to improve the steering stability of the vehicle.

This and other objects of the present invention will become apparent from the description hereinafter.

SUMMARY OF THE INVENTION

In accordance with the present invention, there is provided a pneumatic tire including a tread portion having on its surface:

a pair of inner circumferential main grooves disposed on both sides of a tire equator and extending continuously in a circumferential direction of the tire, a pair of outer circumferential main grooves disposed axially outward of the inner circumferential main grooves and extending continuously in the circumferential direction of the tire, a center land portion located between the inner circumferential main grooves, middle land portions located between each of the inner circumferential main grooves and each of the outer circumferential main grooves, and shoulder land portions located between the outer circumferential main grooves and both tread edges, the tread portion having an asymmetric tread pattern wherein a pattern of a vehicle outer side area of the tread surface which lies on a vehicle outer side with respect to the tire equator when the tire is fitted to a vehicle and a pattern of a vehicle inner side area of the tread surface which lies on a vehicle inner side with respect to the tire equator when the tire is fitted to the vehicle are different from each other, and the pattern of the vehicle outer side area has a land proportion Lo larger than a land proportion Li of the pattern of the vehicle inner side area, the middle land portion located in the vehicle outer side area having outer middle lateral grooves crossing the middle land portion to form a plurality of outer middle blocks, and the shoulder land portion located in the vehicle outer side area having outer shoulder lateral grooves crossing the shoulder land portion to form a plurality of outer shoulder blocks, and an inclination direction of the outer middle lateral grooves being opposite to that of the outer shoulder lateral grooves with respect to an axial direction of the tire, an inclination angle θmo of the outer middle lateral grooves being from 5 to 45° with respect to the axial direction of the tire, and an inclination angle θso of the outer shoulder lateral grooves being more than 0° and not more than 40° with respect to the axial direction of the tire.

Preferably, a difference "θmo−θso" between the inclination angle θmo of the outer middle lateral grooves and the inclination angle θso of the outer shoulder lateral grooves is from 5 to 25°.

Preferably, the outer middle lateral grooves comprises first grooves and second grooves having a groove width at least a part of which is smaller than a groove width of the first grooves, and these first and second grooves are disposed alternately in the circumferential direction of the tire.

Preferably, the outer shoulder lateral grooves comprises first grooves extending obliquely in a direction opposite to the inclination direction of the outer middle lateral grooves over the entire length of the outer shoulder lateral groove, and second grooves each comprising a main part extending substantially parallel to the first grooves and a subpart extending in the same inclination direction as that of the outer middle lateral grooves from a bending point which is located near the outer circumferential main groove and at which the second groove is bent, and these first and second grooves are disposed alternately in the circumferential direction of the tire. The axial distance L from the outer circumferential main groove to the bending point is preferably from 3 to 7 mm.

Preferably, the middle land portion located in the vehicle inner side area has inner middle lateral grooves crossing this middle land portion, thereby providing a plurality of inner middle blocks. The inclination direction of the inner middle lateral grooves is opposite to that of the outer shoulder lateral grooves with respect to the axial direction of the tire, and the inclination angle θmi of the inner middle lateral grooves is from 45 to 60° with respect to the axial direction of the tire.

Preferably, the shoulder land portion located in the vehicle inner side area has inner shoulder lateral grooves crossing the shoulder land portion, thereby providing a plurality of inner shoulder blocks. The inclination direction of the inner shoulder lateral grooves is opposite to that of the outer middle lateral grooves with respect to the axial direction of the tire, and the inclination angle θsi of the inner shoulder lateral grooves is more than 0° and not more than 20° with respect to the axial direction of the tire.

Preferably, the center land portion is provided with at least one slot extending from the inner circumferential main groove located in the vehicle outer side area and terminating in the center land portion. The slot or slots preferably extend obliquely in the same inclination direction as that of the outer middle lateral grooves with respect to the axial direction of the tire.

In the present invention, as stated above, a pneumatic tire having an asymmetric tread pattern that the land proportion of the vehicle outer side area is larger than the land proportion of the vehicle inner side area, are produced to divide each of the middle and shoulder land portions which are located on the vehicle outer side area and have a large influence on a difference in drainage performance between right and left wheel tires, into a plurality of blocks by the outer middle and shoulder lateral grooves, respectively, whereby a certain degree of the drainage performance is secured under a condition of a high land proportion. Further, in the present invention, the outer middle and shoulder lateral grooves are inclined in opposite directions with respect to the tire axial direction. Therefore, for example, either the outer middle lateral grooves or the outer shoulder lateral grooves can discharge water toward the rear side of the tire rotation direction in a direction to the tread edge in a left wheel tire, and the other lateral grooves can discharge water toward the rear side of the tire rotation is direction in a direction to the tread edge in a right wheel tire. Thus, a difference in drainage performance between the right and left wheel tires can be suppressed to enhance the steering stability of the vehicle. In particular, since the outer middle lateral grooves are inclined at an angle θmo of 5 to 45° with respect to the tire axial direction and the outer shoulder lateral grooves are inclined at an angle θso of more than 0° to not more than 40° with respect to the tire axial direction, the inclination direction of these grooves approaches a water flow line and, therefore, the drainage performance difference between the right and left wheel tires can be diminished with enhancing the drainage performance of these lateral grooves.

The term "tread surface" as used herein means a surface in a region between tread edges of a tire, and the term "tread edges" as used herein means axially outer edges of a ground contact surface of the tire which comes into contact with a ground (flat surface) when the tire is mounted on a standard rim, inflated to a normal inner pressure and such a tire in the normal inner pressure condition is then loaded with a normal load. The term "standard rim" as used herein means a rim defined for every tire in a standardizing system on which the tire is based and, for example, denotes "standard rim" in JATMA, "Design Rim" in TRA and "Measuring Rim" in ETRTO. Also, the term "normal inner pressure" as used herein means an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa. Further, the term "normal load" means a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

DETAILED DESCRIPTION OF THE INVENTION

An embodiment of the present invention will now be explained with reference to the accompanying drawings.

Figure 1:
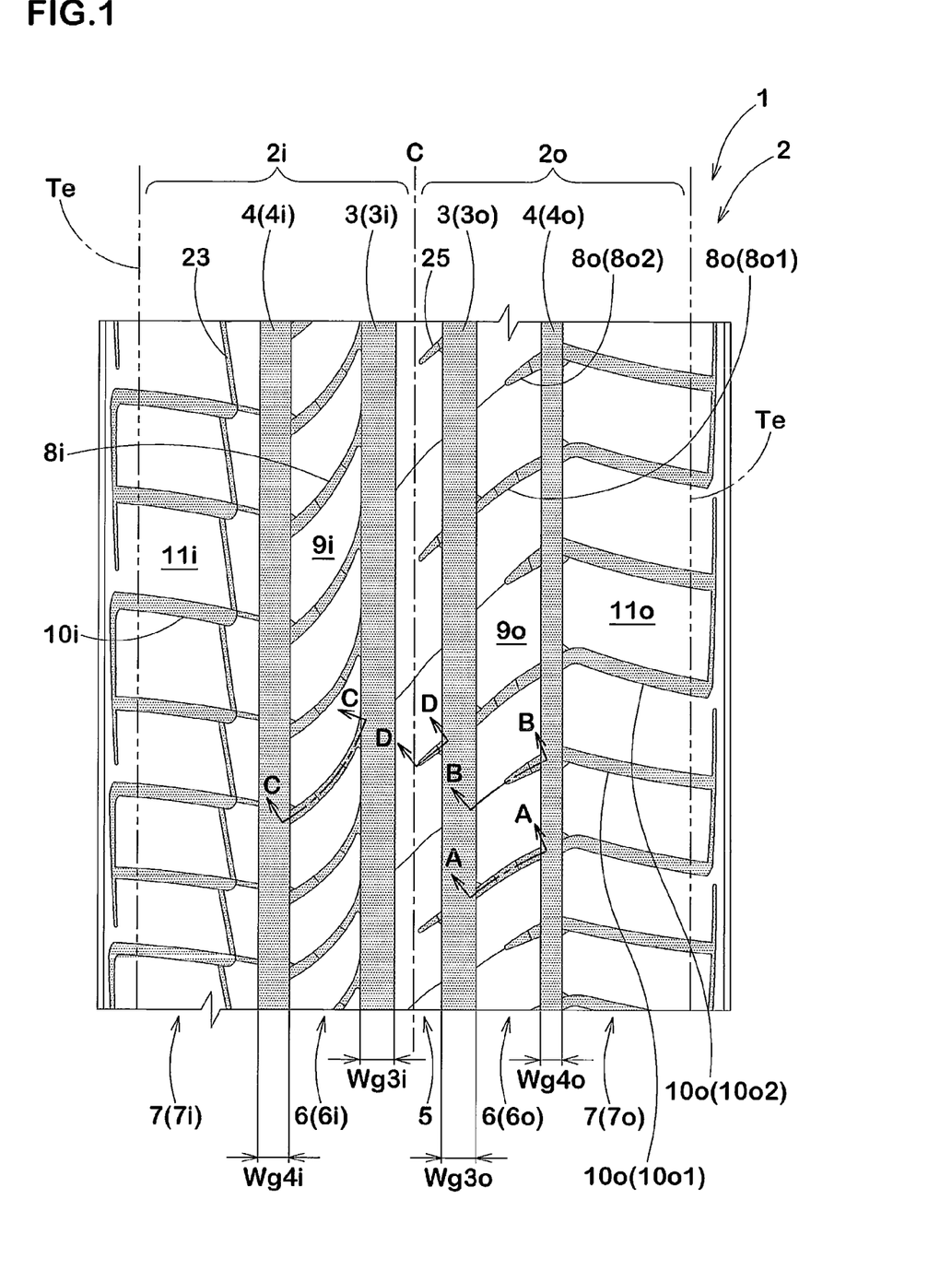
FIG. 1 is a development view of a tread portion of a pneumatic tire according to an embodiment of the present invention.

FIG. 1 is a development view illustrating a tread pattern in the case where the pneumatic tire of the present invention is intended for passenger cars.

As shown in FIG. 1, pneumatic tire 1 in this embodiment has, on a tread surface 2, an asymmetric pattern that a half of the tread pattern for a vehicle outer side area 2o which lies on a vehicle outer side with respect to a tire equator C when the tire is fitted to a vehicle and the other half for a vehicle inner side area 2i which lies on a vehicle inner side with respect to the tire equator when the tire is fitted to the vehicle are different from each other.

The tread surface 2 is provided with a pair of axially inner circumferential main grooves 3 disposed on both sides of the tire equator C in proximity to it and extending continuously in a circumferential direction of the tire, and a pair of axially outer circumferential main grooves 4 disposed axially outward of the inner circumferential grooves 3 and extending continuously in the circumferential direction of the tire, whereby the tread surface 2 is divided into a center land portion 5 located between the pair of the inner circumferential grooves 3, 3, middle land portions 6, 6 located between each of the inner circumferential grooves 3 and each of the outer circumferential grooves 4, and shoulder land portions 7, 7 located between the outer circumferential grooves 4 and both tread edges Te.

A middle land portion 6o in the vehicle outer side area 2o is divided into a plurality of outer middle blocks 6o by outer middle lateral grooves 8o crossing the middle land portion 6o. A shoulder land portion 7o in the vehicle outer side area 2o is divided into a plurality of outer shoulder blocks 11o by outer shoulder lateral grooves 10o crossing the shoulder land portion 7o. Further, a middle land portion 6i located in the vehicle inner side area 2i is divided into a plurality of inner middle blocks 9i by inner middle lateral grooves 8i crossing this middle land portion 6i. A shoulder land portion 7i located in the vehicle inner side area 2i is divided into a plurality of inner shoulder blocks 11i by inner shoulder lateral grooves 10i crossing this shoulder land portion 7i.

Figure 2:
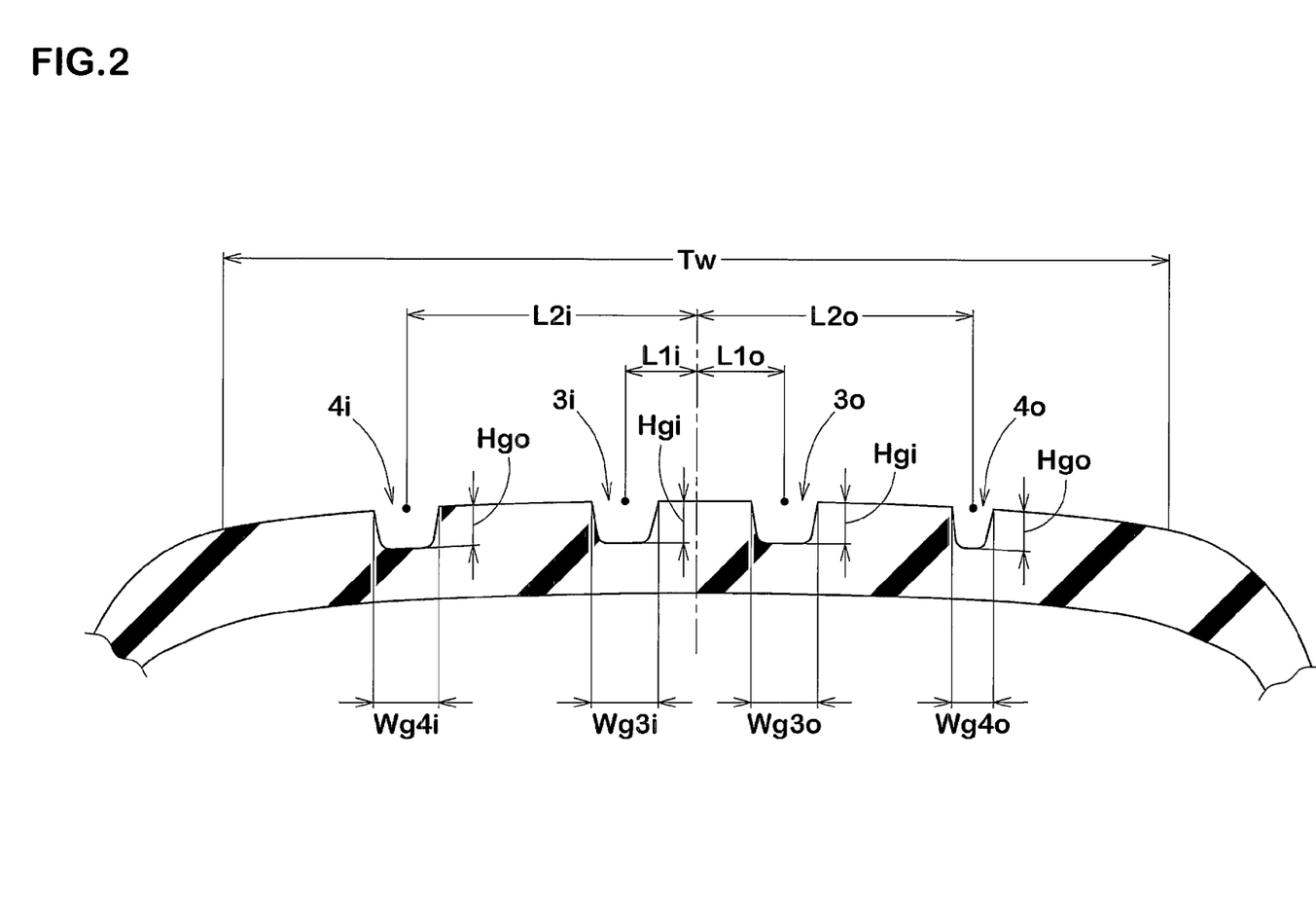
FIG. 2 is a cross sectional view of the tread portion.

The circumferential main grooves 3 and 4 are wide grooves having a width Wg of at least 4 mm, preferably at least 6 mm, and extend circumferentially in a straight line form or in a zigzag form (including a wave-like form). Straight grooves are preferred from the viewpoint of drainage performance. It is preferable from the viewpoint of balance between wet performances and dry performances that as shown in FIG. 2, among inner and outer circumferential main grooves 3o and 4o disposed in the vehicle outer side area 2o and inner and outer circumferential main grooves 3i and 4i disposed in the vehicle inner side area 2i, at least the outer circumferential main groove 4o disposed in the vehicle outer side area 2o has a groove width Wg4o smaller than those of the remaining circumferential main grooves, i.e., groove widths Wg3o, Wg3i and Wg4i of the circumferential main grooves 3o, 3i and 4i. It is particularly preferable that the groove width Wg4o is within the range of 60%±10%, i.e. 50 to 70%, of the groove width Wg4i of the axially outer circumferential main groove 4i disposed in the vehicle inner side area 2i. In case of the pneumatic tire exemplified in this embodiment, the groove width Wg4o of the outer circumferential groove 4o is from 3.2 to 4.6% of a tread width Tw, and the groove widths Wg3o, Wg3i and Wg4i of the other circumferential grooves are from 4.6 to 8.0% of the tread width Tw.

The term "tread width" as used herein means an axial distance between the tread edges Te, Te.

Preferably, axial distances L1i and L1o from the tire equator C to width center lines of the axially inner circumferential grooves 3i and 3o are from 7.5 to 10% of the tread width Tw, respectively. Preferably, axial distances L2i and L2o from the tire equator C to width center lines of the axially outer circumferential grooves 4i and 4o are from 27.5 to 30% of the tread width Tw, respectively.

Groove depth Hg of the circumferential main grooves 3 and 4 is not particularly limited, but it is generally from 6.5 to 9.0 mm. From the viewpoint of balance between wet performances and dry performances, it is preferable that the axially inner circumferential grooves 3 have a groove depth Hgi larger than a groove depth Hgo of the axially outer circumferential grooves 4 and, for example, the depth Hgi is 8.1 mm and the depth Hgo is 7.7 mm.

The tread pattern of the vehicle outer side area 2o has a land proportion Lo larger than a land proportion Li of the tread pattern of the vehicle inner side area 2i. From the viewpoint of enhancing both the dry performances and the wet performances to high levels with a good balance, it is preferable that a difference "Lo−Li" between the land proportions Lo and Li is from 1 to 5%. Further, it is preferable that the land proportion Lo in the vehicle outer side area 2o is from 33 to 35%, and the land proportion Li in the vehicle inner side area 2i is from 30 to 32%. As well known, the term "land proportion" as used herein means a proportion of the total ground contact surface of the whole land portions of each of the vehicle inner and outer side areas 2i and 2o based on the whole surface area of each of the vehicle inner and outer side areas 2i and 2o (including the area of whole grooves).

Figure 3:
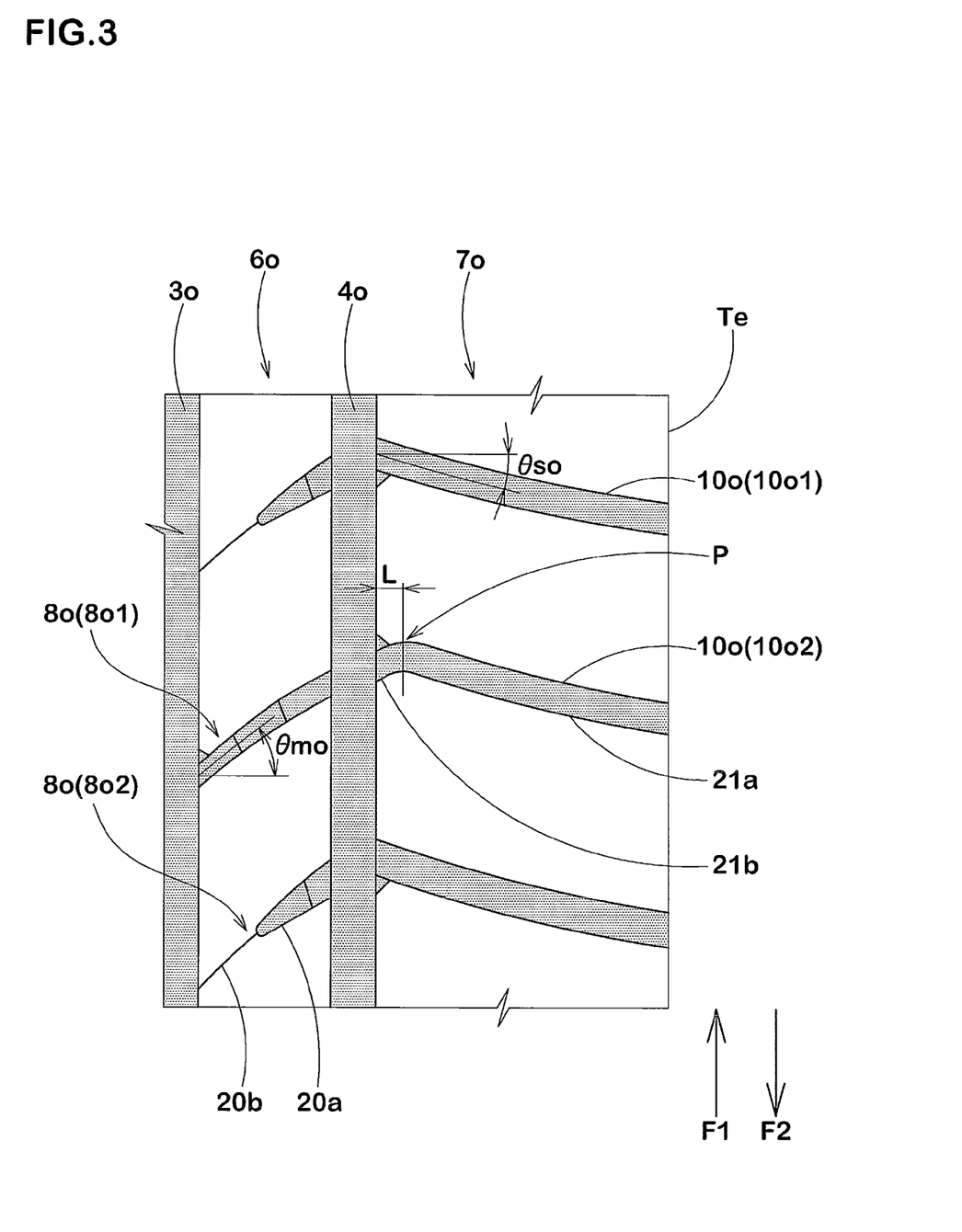
FIG. 3 is a plan view showing outer middle and shoulder lateral grooves in an enlarged form.

As shown in FIG. 3 in an enlarged form, the inclination direction of the outer middle lateral grooves 8o is opposite to that of the outer shoulder lateral grooves 10o with respect to an axial direction of the tire. In other words, either the outer middle lateral grooves 8o or the outer shoulder lateral grooves 10o extend from a tire equator side toward a tread edge side and are inclined in a rolling direction of the tire, and the other lateral grooves 8o or 10o extend from a tire equator side toward a tread edge side but are inclined in a direction opposite to the rolling direction. The inclination angle θmo of the outer middle lateral grooves 8o is from 5 to 45° with respect to the axial direction of the tire, and the inclination angle θso of the outer shoulder lateral grooves 10o is more than 0° and not more than 40° with respect to the axial direction of the tire. In case of the embodiment shown in FIGS. 1 to 4, the outer middle lateral grooves 8o are inclined toward the upper right (this inclination direction being referred to as "upper right inclination"), and the outer shoulder lateral grooves 10o are inclined toward the lower right (this inclination direction being referred to as "lower right inclination"), as shown in FIG. 1.

When the tires 1 are mounted to a vehicle, the direction of the tread pattern is opposite to each other between a right wheel tire and a left wheel tire. That is to say, in case of forward traveling, if the right wheel tire rotates in a direction F1 shown in FIG. 3, the left wheel tire rotates in a direction F2. In this case, in the right wheel tire, water on a road is discharged toward the tread edge Te side and the rear side of the tire rotation direction F1 (traveling direction) through the outer shoulder lateral grooves 10o. In the left wheel tire, water on a road is discharged toward the tread edge Te side and the rear side of the tire rotation direction F2 (traveling direction) through the outer middle lateral grooves 80.

That is to say, in case of this embodiment, in the vehicle outer side area 2o which has a large influence on the drainage performance difference between the right and left wheel tires, the outer shoulder lateral grooves 10o can exhibit a high drainage performance in the right wheel tire, and the outer middle lateral grooves 8o can exhibit a high drainage performance in the left wheel tire, thus reducing the drainage performance difference between the right and left wheel tires.

If the inclination angle θmo of the outer middle lateral grooves 8o is less than 5° with respect to the tire axial direction, no sufficient drainage performance is obtained, and if the inclination angle θmo is more than 45°, the pattern rigidity is insufficient, so significant improvement in dry performances is not achieved. Further, if the inclination angle θso of the outer shoulder lateral grooves 10o is 0°, a noise may be increased, and if the inclination angle θso is more than 40°, the pattern rigidity is insufficient, so significant improvement in dry performances is not achieved. From such points of view, it is preferable that the inclination angle θmo is 10° or more and is 40° or less, and the inclination angle θso is 5° or more and is 35° or less.

From the viewpoints of drainage performance and noise performance, it is preferable that the inclination angle θmo is larger than the inclination angle θso. However, if a difference "θmo−θso" between the inclination angle θmo and the inclination angle θso is too large, a difference in drainage performance between the outer middle lateral grooves 8o and the outer shoulder lateral grooves 10o increases, so the drainage performance difference between right wheel tire and left wheel tire cannot be reduced. On the other hand, if the difference "θmo−θso" is too small, the noise performance is deteriorated. Accordingly, it is preferable that the difference "θmo−θso" is from 5 to 25°.

The outer middle lateral grooves 8o extend obliquely between the inner and outer circumferential grooves 3o and 4o, but they may include one or more lateral grooves having a decreased width partly or over a full length of the groove. Such lateral grooves having a decreased width may be, for instance, a groove having a gradually decreased width over the full length, a groove a part of which has a gradually decreased width, a groove a part of which is a very narrow groove having a width of 1.5 mm or less, and combinations thereof. In case of disposing the lateral grooves having a decreased width, it is preferable to dispose a lateral groove having substantially constant width and the lateral groove having a decreased width in a regular manner. The outer middle lateral groove 8o is preferably a substantially straight groove or a very slightly curved groove.

In the embodiment shown in FIGS. 1 to 4, the outer middle lateral groove 8o comprises a first outer middle lateral groove 8o1 and a second outer middle lateral groove 8o2 a part or whole of which has a decreased width as compared with the first groove 8o1. The first outer middle lateral groove 8o1 has substantially a constant width. The second outer middle lateral groove 8o2 shown in FIGS. 1 and 3 comprises a tapered groove portion 20a that extends toward the tire equator side with gradually decreasing its width, and a fine groove portion 20b having a groove width of 1.5 mm or less that extends from an axially inner end of the portion 20a up to the inner circumferential main groove 3o. The first and second outer middle lateral grooves 8o1 and 8o2 are disposed alternately in the tire circumferential direction. By disposing the second groove 8o2 having a decreased width together with the first groove 8o1, the total groove area of the outer middle lateral grooves 8o having a large inclination angle θmo can be reduced, and the total groove area of the outer shoulder lateral grooves 10o having a smaller inclination angle θso can be increased. Thus, the drainage performance difference between the right and left wheel tires can be further reduced. Also, by disposing the second groove 8o2, lowering of the rigidity of the middle land portion 6o owing to the inclination angle being large can be suppressed.

The outer shoulder lateral grooves 10o have substantially a constant width and extend substantially straight to cross the shoulder land portion 7o, but they may include one or more bent or curved lateral grooves.

In the embodiment shown in FIGS. 1 to 4, the outer shoulder lateral groove 10o comprises a first outer shoulder lateral groove 10o1 extending with inclination to one side in the tire circumferential direction over the entire length thereof, and a second outer shoulder lateral groove 10o2 having a bent portion. These first and second outer shoulder lateral grooves 10o1 and 10o2 are disposed alternately in the circumferential direction of the tire. The second outer shoulder lateral groove 10o2 comprises a main part 21a substantially parallel to the first outer shoulder lateral groove 10o1, and a subpart 21b extending with inclination to the other side in the tire circumferential direction, i.e., the opposite side to the inclination of the main part 21a with respect to the axial direction, from a bending point P which is located near the outer circumferential main groove 4o and at which the second groove 10o2 is bent, to the outer circumferential main groove 4o.

In case of such an outer shoulder lateral groove 10o comprising the first and second grooves 10o1 and 10o2, if the tire rotation direction in forward traveling is a direction F1 shown in FIG. 3, water on a road is discharged toward the tread edge Te side and the rear side of the tire rotation direction F1 (traveling direction) through the first and second outer shoulder lateral grooves 10o1 and 10o2, as stated above. Further, if the tire rotation direction in forward traveling is a direction F2 shown in FIG. 3, the subpart 21b of the second outer shoulder lateral groove 10o2 can guide a part of water present in the outer circumferential main groove 4o toward the main part 21a side. Further, in this case (tire rotation direction F2), flowing of water into the main part 21a is accelerated by water flowing from the outer middle lateral groove 8o into the outer circumferential main groove 4o, whereby the second outer shoulder lateral grooves 10o2 exhibit a water discharging function even for the tire rotation direction F2, thus further reducing the drainage performance difference between the right and left wheel tires.

The axial distance L from the outer circumferential main groove 4o to the bending point P is preferably from 3 to 7 mm. If the distance L of the bending point P is less than 3 mm, the subpart 21b tends to be difficult to exhibit the water-guiding function, and if the distance L is more than 7 mm, the drainage performance tends to lower when the tire rotation direction is F1.

The inclination angle θso for the second outer shoulder lateral groove 10o2 is determined by the angle of the main part 21a. In case that the inclination angle θmo or θso is varied, an average value of the maximum and minimum values of the angle θmo in the lateral groove 8o and an average value of the maximum and minimum values of the angle θso in the lateral groove 10o (or in the main part 21a for the lateral groove 10o2) are adopted, respectively.

Figure 4:
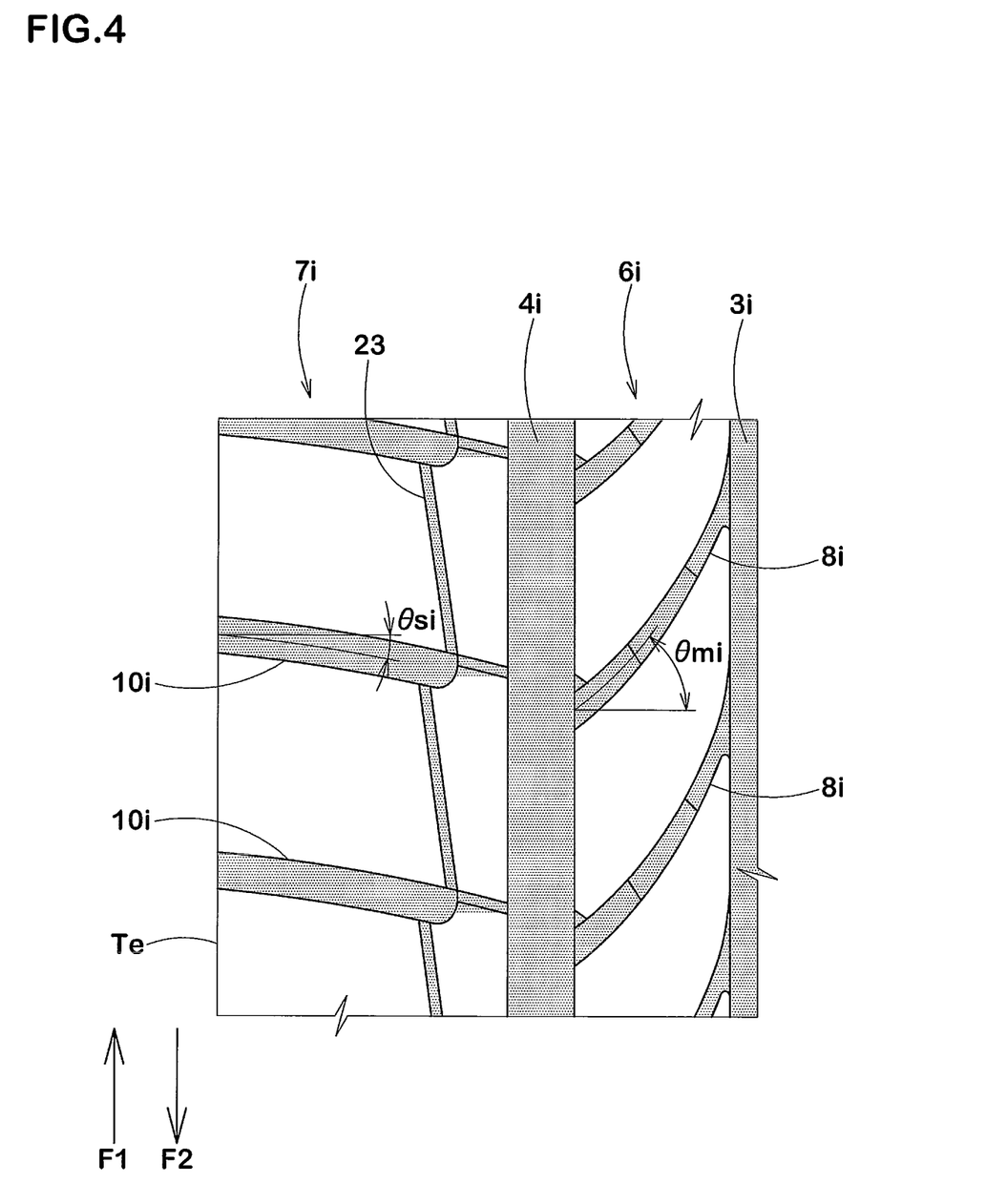
FIG. 4 is a plan view showing inner middle and shoulder lateral grooves in an enlarged form.

In this embodiment shown in the drawings, the lateral grooves in the vehicle inner side area 2i which exerts a smaller influence on the drainage performance difference between right and left wheel tires are also disposed in the same manner as in the vehicle outer side area 2o. That is to say, as shown in FIG. 4 in an enlarged form, the inclination direction of the inner middle lateral grooves 8i is opposite to that of the inner shoulder lateral grooves 10i with respect to the axial direction of the tire. Specifically, the inner middle lateral grooves 8i are inclined toward the upper right (upper right inclination), and this inclination direction is also opposite to the lower right inclination direction of the outer shoulder lateral grooves 10o. The inner shoulder lateral grooves 10i are inclined toward the lower right (lower right inclination), and this inclination direction is also opposite to the upper right inclination direction of the outer middle lateral grooves 8o.

Therefore, if the tire rotation direction in forward traveling is a direction F1 shown in FIG. 4, water on a road is discharged toward the tread edge Te side and toward the rear side of the tire rotation direction F1 (toward later grounding side from first grounding side) through the inner middle lateral grooves 8i. Further, if the tire rotation direction in forward traveling is a direction F2 shown in FIG. 4, water on a road is discharged toward the tread edge Te side and the rear side of the tire rotation direction F2 (later grounding side from first grounding side) through the inner shoulder lateral grooves 10i. Thus, the drainage performance difference between right and left wheel tires can be reduced also in the vehicle inner side area 2i.

In this embodiment, the inner middle lateral groove 8i has a function of controlling an average residual CF (cornering force) to suppress drafting of a vehicle. The drafting is suppressed by setting the inclination angle θmi at 45° or more with respect to the tire axial direction. The drainage performance is also enhanced thereby. If the inclination angle θmi of the inner middle lateral grooves 8i is more than 60° with respect to the axial direction of the tire, the pattern rigidity is reduced to induce deterioration of wear resistance and dry performances. Therefore, from such points of view, it is preferable that the inclination angle θmi of the inner middle lateral grooves 8i is from 45 to 60°. Further, it is preferable that the inclination angle θsi of the inner shoulder lateral grooves 10i is more than 0° and not more than 20° with respect to the axial direction of the tire. If the inclination angle θsi is less than 0°, the noise performance is deteriorated, and if it is more than 20°, the pattern rigidity is reduced to induce deterioration of wear resistance and dry performances.

The inner middle lateral groove 8i may be a substantially straight groove or a slightly curved groove.

The inner shoulder lateral groove 10i may have a substantially constant width, or a part of the groove 10i may have a decreased width. In the embodiment shown in FIG. 1, a portion contiguous to the circumferential groove 4i of the lateral groove 10i has a decreased width. Further, adjacent inner shoulder lateral grooves 10i are connected to each other through circumferentially extending joint grooves 23, thereby balancing the drainage performance between the middle land portion 6i and the shoulder land portion 7i.

In the embodiment shown in the drawings, the number of pitches per a round of tire are the same for all of the lateral grooves 8i, 8o, 10i and 10o. The width of each of these lateral grooves is suitably determined so that the predetermined land proportions Li and Lo can be secured.

The center land portion 5 in this embodiment includes a plurality of slots 25 extending from the inner circumferential main groove 3o located in the vehicle outer side area 2o and terminating in the center land portion 5 without reaching the inner circumferential groove 3i located in the vehicle inner side area 2i, especially terminating at the tire equator C or near the tire equator C. The slots 25 extend obliquely in the same inclination direction as that of the outer middle lateral grooves 8o with respect to the axial direction of the tire. The slots 25 serve to efficiently discharge water on the center land portion 5 at which the ground contact pressure is the highest.

Figures 5A, 5B, 5C:
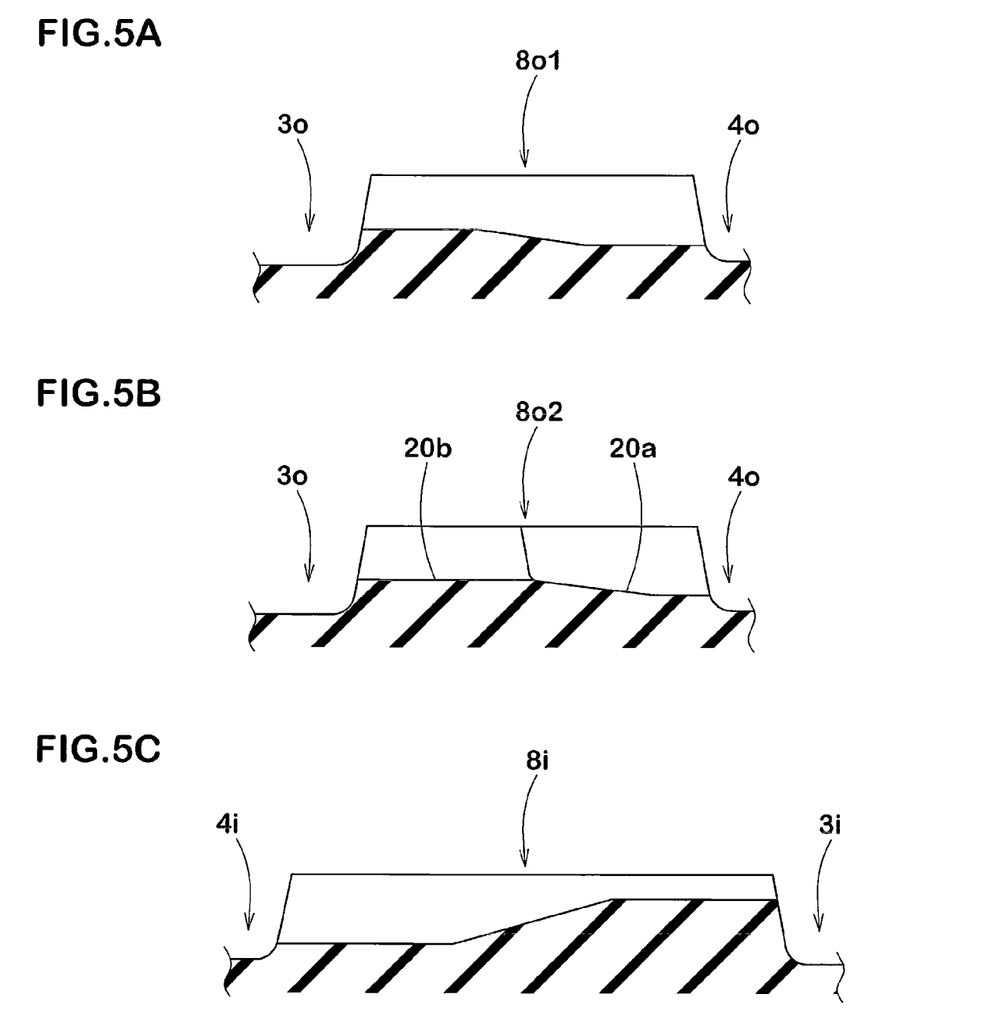
FIGS. 5A to 5D are cross sectional views taken on line A-A, line B-B, line C-C, and line D-D in FIG. 1.
Figure 5D:
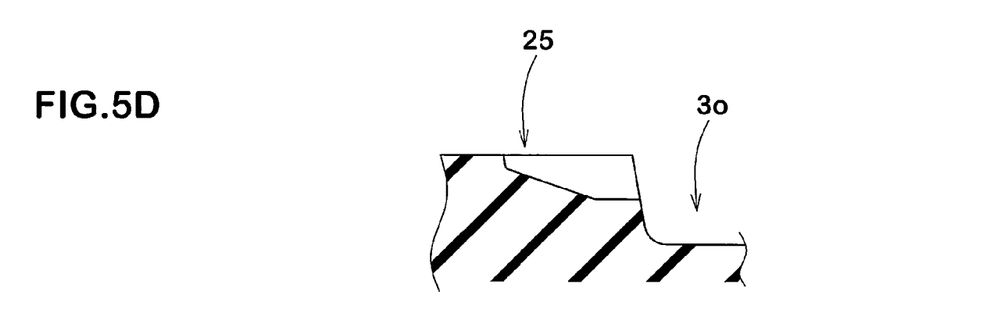

FIGS. 5A and 5B show cross sectional shapes of the first and second outer middle lateral grooves 8o1 and 8o2 along the groove width center of each groove, respectively. FIGS. 5C and 5D show cross sectional shapes of the inner middle lateral groove 8i and the slot 25 along the width center of each groove, respectively. The lateral grooves 8o1, 8o2 and 8i and the slot 25 have a groove depth smaller than the groove depths Hgi and Hgo of the circumferential main grooves 3 and 4 and have a shallow part at which the groove bottom rises up, thereby enhancing the pattern rigidity. The depth of each of the lateral grooves 8o1, 8o2 and 8i and the slot 25 gradually increases from the tire equator C side toward the tread edge Te side, thereby enhancing the effect of discharging water from the tire equator C side toward the tread edge Te side.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Radial tires for passenger cars having a size of 245/40R18 and a basic tread pattern shown in FIG. 1 were manufactured based on the specifications shown in Table 1, and were tested with respect to wet performance, wear resistance and dry performance. Specifications of tires other than those described in the table, namely other than inclination direction and angle of respective lateral grooves, are substantially common to all tires.

| | |
|---|---|
| Tread width TW: | 216 mm |
| Land proportion Lo of vehicle outer side area: | 35% |
| Land proportion Li of vehicle inner side area: | 30% |
| Outer circumferential main groove 4o: | Width Wg4o = 8 mm |
| | Depth Hgo = 7.7 mm |
| Outer circumferential main groove 4i: | Width Wg4i = 8 mm |
| | Depth Hgo = 7.7 mm |
| Inner circumferential main groove 3o: | Width Wg3o = 13 mm |
| | Depth Hgi = 8.1 mm |
| Inner circumferential main groove 3i: | Width Wg3i = 13 mm |
| | Depth Hgi = 8.0 mm |

The performances of the tires were evaluated by the following methods. The results are shown in Table 1.

<Wet Performance>

The tires were mounted on each rim (size: 18×8.5JJ), inflated to an inner pressure of 230 kPa and attached to all wheels of a 4300 cc FR passenger car made in Japan. The test car was run under condition of a single ride of only driver in each of clockwise and counterclockwise directions on a curved test course of a 100 m radius circular asphalt road provided with a puddle having a depth of 10 mm. Maximum value of lateral acceleration (lateral G) was measured in each of the clockwise running and the counterclockwise running when entering into the puddle at a speed of 80 km/h. The results are shown by an index based on the result of the counterclockwise running in Example 1 regarded as 100. The larger the value, the better the wet performance (drainage performance).

<Dry Performance>

The above-mentioned test car was run on the test course of a dry asphalt road. The steering stability was evaluated by driver's feeling. The results are shown by an index based on the result of Example 1 regarded as 100. The larger the value, the better the dry performance.

<Wear Resistance>

After the above-mentioned car was run 8,000 km on the test course, the state of wear of the tires were visually observed. The results are shown by an index based on the result of Example 1 regarded as 100. The larger the value, the better the wear resistance.

TABLE 1

| | Example 1 | Example 2 | Com. Ex. 1 | Com. Ex. 2 |
|---|---|---|---|---|
| Inner side area 2i | | | | |
| Angle θsi of inner shoulder lateral grooves 10i | +10 | +30 | +45 | +10 |
| Angle θmi of inner middle lateral grooves 8i | −45 | −45 | −45 | +45 |

TABLE 1-continued

|  | Example 1 | Example 2 | Com. Ex. 1 | Com. Ex. 2 |
|---|---|---|---|---|
| Outer side area 2o | | | | |
| Angle θmo of outer middle lateral grooves 8o | −20 | −30 | −45 | +20 |
| Angle θso of outer shoulder lateral grooves 10o | +10 | +30 | +45 | +10 |
| Wet performance | | | | |
| Counterclockwise running (index) | 100 | 105 | 80 | 100 |
| Clockwise running (index) | 100 | 105 | 110 | 80 |
| Wear resistance (index) | 100 | 95 | 70 | 100 |
| Dry performance (index) | 100 | 90 | 70 | 100 |

Notes:
As to the angles θsi, θmi, θmo and θso, "+" denotes lower right inclination and "−" denotes upper right inclination.

From the results shown in Table 1, it is understood that the pneumatic tires of the Examples according to the present invention can reduce a difference in wet performance depending on the rotation direction of the tire while maintaining the dry performance and the wear resistance or suppressing lowering thereof.

What is claimed is:

1. A pneumatic tire comprising a tread portion provided with
a pair of inner circumferential main grooves disposed one on each side of a tire equator and extending continuously in a circumferential direction of the tire,
a pair of outer circumferential main grooves disposed axially outward of the inner circumferential main grooves, respectively, and extending continuously in the circumferential direction of the tire,
a center land portion defined between the inner circumferential main grooves,
a pair of middle land portions each defined between one of the inner circumferential main grooves and the adjacent outer circumferential main groove, and
a pair of shoulder land portions each defined between one of the outer circumferential main grooves and the adjacent tread edge, wherein,
the tread portion has an asymmetric tread pattern, wherein an outward pattern on one side of the tire equator and an inward pattern on the other side of the tire equator which are to be located on the outside and inside of a vehicle, respectively, when the tire is fitted to the vehicle are different from each other,
the outward pattern has a land proportion Lo larger than a land proportion Li of the inward pattern,
the middle land portion located in the outward pattern has outer middle lateral grooves crossing the entire width of the middle land portion to form a plurality of outer middle blocks,
the shoulder land portion located in the outward pattern has outer shoulder lateral grooves crossing the entire width of the shoulder land portion to form a plurality of outer shoulder blocks,
said outer middle lateral grooves are inclined with respect to an axial direction of the tire to one direction at an inclination angle θmo, the inclination angle θmo being from 5 to 45°,
said outer shoulder lateral grooves are first outer shoulder lateral grooves and second outer shoulder lateral grooves arranged alternately in the tire circumferential direction,
each said first outer shoulder lateral groove is, over the entire length thereof, inclined with respect to the axial direction of the tire to one direction opposite to that of the outer middle lateral grooves at an inclination angle θso of more than 0 degree and not more than 40 degrees,
each said second outer shoulder lateral groove comprises a main part and a subpart,
the main part extends axially inwardly from the tread edge in substantially parallel to the first outer shoulder lateral grooves,
the subpart extends axially outwardly from the outer circumferential main groove to the main part while inclining with respect to the axial direction of the tire to a direction opposite to that of the main part so as to form a bending point which is located near the outer circumferential main groove and at which the second outer shoulder lateral groove is bent,
the first outer shoulder lateral grooves and second outer shoulder lateral grooves each have a substantially constant width,
the shoulder land portion located in the inward pattern has inner shoulder lateral grooves crossing the entire width of the shoulder land portion to form a plurality of inner shoulder blocks,
each said inner shoulder lateral groove is partially decreased in the width to form a narrow part and a resultant wide part, and
the narrow part is connected to the outer circumferential main groove in the inward pattern, and the wide part extends to the tread edge.

2. The pneumatic tire of claim 1, wherein a difference "θmo-θso" between the inclination angle θmo of the outer middle lateral grooves and the inclination angle θso of the outer shoulder lateral grooves is from 5 to 25°.

3. The pneumatic tire of claim 1, wherein the outer middle lateral grooves in the outward pattern are first outer middle lateral grooves and second outer middle lateral grooves arranged alternately in the circumferential direction of the tire, and the second outer middle lateral grooves are each partially decreased in the width in contrast to the first outer middle lateral grooves.

4. The pneumatic tire of claim 1, wherein an axial distance L from said bending point to the outer circumferential main groove is from 3 to 7 ma.

5. The pneumatic tire of claim 1, wherein
the middle land portion located in the inward pattern has inner middle lateral grooves crossing the entire width of the middle land portion to form a plurality of inner middle blocks,
the inner middle lateral grooves are inclined with respect to the axial direction of the tire to one direction opposite to that of the outer shoulder lateral grooves, and
the inclination angle θmi of each of the inner middle lateral grooves is from 45 to 60° with respect to the axial direction of the tire.

6. The pneumatic tire of claim 1, wherein
the inner shoulder lateral grooves are inclined with respect to the axial direction of the tire to one direction opposite to that of the outer middle lateral grooves, and
the inclination angle θsi of each of the inner shoulder lateral grooves is more than 0° and not more than 20° with respect to the axial direction of the tire.

7. The pneumatic tire of claim 1, wherein
the center land portion is provided with slots extending from the inner circumferential main groove located in the outward pattern and terminating in the center land portion, and
the slots extend obliquely in the same inclination direction as that of the outer middle lateral grooves.

* * * * *